(12) United States Patent
Nakahara et al.

(10) Patent No.: US 8,304,953 B2
(45) Date of Patent: Nov. 6, 2012

(54) ROTATING ELECTRICAL MACHINE

(75) Inventors: Akihito Nakahara, Hitachi (JP);
Hiroyuki Mikami, Hitachinaka (JP);
Kazumasa Ide, Hitachiota (JP);
Kazuhiko Takahashi, Hitachi (JP);
Kenichi Hattori, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/035,395

(22) Filed: Feb. 25, 2011

(65) Prior Publication Data

US 2011/0140566 A1    Jun. 16, 2011

Related U.S. Application Data

(62) Division of application No. 12/428,875, filed on Apr. 23, 2009.

(30) Foreign Application Priority Data

Apr. 25, 2008 (JP) ................................ 2008-114765
Apr. 20, 2009 (JP) ................................ 2009-101527

(51) Int. Cl.
*H02K 1/02* (2006.01)
*H02K 1/06* (2006.01)
*H02K 9/00* (2006.01)

(52) U.S. Cl. .................... 310/216.006; 310/58; 310/59; 310/216.008; 310/216.016; 148/307; 148/308

(58) Field of Classification Search ........... 310/216.006, 310/216.016, 216.008, 58, 59; 148/307, 148/308
See application file for complete search history.

(56) References Cited

U.S. PATENT DOCUMENTS

| 2,554,226 | A | * | 5/1951 | Taylor ........................... 310/431 |
| 3,739,208 | A | | 6/1973 | Shartrand |
| 3,812,392 | A | * | 5/1974 | Barton et al. .......... 310/216.111 |
| 5,172,020 | A | * | 12/1992 | Hibino et al. .................... 310/26 |
| 6,569,265 | B1 | * | 5/2003 | Anderson et al. ............. 148/307 |
| 6,938,324 | B2 | | 9/2005 | Koshiishi et al. |
| 7,057,324 | B2 | | 6/2006 | Breznak et al. |

(Continued)

FOREIGN PATENT DOCUMENTS

EP          1 633 031 A2     3/2006
(Continued)

OTHER PUBLICATIONS

'Permeability', www.Wikipedia.com.*
(Continued)

*Primary Examiner* — John K Kim
(74) *Attorney, Agent, or Firm* — Brundidge & Stanger, P.C.

(57) ABSTRACT

A rotating electrical machine includes: a rotor comprising a rotor core and a field winding wound round the rotor core; and a stator comprising a stator core and a stator winding wound round the stator core. The stator is arranged in opposition to the rotor with a predetermined spacing therebetween. the stator core is formed by punching a split piece, which comprises teeth for insertion of the stator winding thereinto and a core back on an outer periphery thereof, from a magnetic steel sheet, and laminating a plurality of those circular configurations in an axial direction, in which a plurality of the split pieces are arranged in a circle in a circumferential direction. The stator core has magnetic steel sheets, which are different in magnetic permeability in a diametrical direction, laminated at an axial end region of and in an axial central region of the stator core.

3 Claims, 7 Drawing Sheets

DIRECTION OF ROLLING

U.S. PATENT DOCUMENTS

| | | | |
|---|---|---|---|
| 7,872,392 B2 * | 1/2011 | Haldemann et al. | ... 310/216.045 |
| 8,174,156 B2 * | 5/2012 | Nakahara et al. | ................ 310/59 |
| 2003/0116236 A1 * | 6/2003 | Hayakawa et al. | ........... 148/516 |
| 2004/0084974 A1 | 5/2004 | Nelson | |
| 2005/0046300 A1 | 3/2005 | Salem et al. | |
| 2006/0043820 A1 * | 3/2006 | Nakahara et al. | ............. 310/254 |
| 2006/0071573 A1 | 4/2006 | Fujita et al. | |
| 2007/0170806 A1 * | 7/2007 | Haldemann et al. | .......... 310/217 |
| 2009/0267428 A1 * | 10/2009 | Nakahara et al. | ................ 310/59 |
| 2011/0140566 A1 * | 6/2011 | Nakahara et al. | ...... 310/216.018 |

FOREIGN PATENT DOCUMENTS

| | | |
|---|---|---|
| EP | 1 646 127 | 4/2006 |
| FR | 2 806 851 | 9/2001 |
| GB | 827 223 | 2/1960 |
| JP | 60-141138 | 7/1985 |
| JP | 61-062334 | 3/1986 |
| JP | 2000-050539 | 2/2000 |
| JP | 2006-074880 | 3/2006 |
| JP | 2006-340488 | 12/2006 |

OTHER PUBLICATIONS

Nakata et al "Measurement of Magnetic Charateristics Along Arbitrary Directions of Grain Oriented Silicon Steel up to High Flux Densities", IEEE Trans. on Magnetics, vol. 29, No. 6, Nov. 1993.*

Wikipedia, Electrical Steel, www.wikipedia.com, Feb. 2012.*

Extended European Search Report in European Patent Application No. 09158652.9-1528 mailed May 16, 2011.

Partial European Search Report in European Application No. 09158652.9 dated Feb. 10, 2011.

* cited by examiner

DIRECTION OF ROLLING

DIRECTION OF ROLLING

ROTATING ELECTRICAL MACHINE

This application is a divisional application of U.S. application Ser. No. 12/428,875, filed Apr. 23, 2009, the entirety of which is incorporated herein by reference.

BACKGROUND OF THE INVENTION

The present invention relates to a rotating electrical machine, and more particularly, to a rotating electrical machine suitable for an arrangement, which is adopted in, for example, turbine-driven generators, etc. and of which a stator core is formed by laminating magnetic steel sheets.

An explanation will be given to a conventional example of a stator core of a large-sized rotating electrical machine.

As shown in FIGS. 11A and 11B, a stator core of a turbine-driven generator is formed into a cylindrical configuration by punching a steel sheet into sector-shaped split pieces from a steel strip and arranging the split pieces in plural in a circumferential direction to define a circular configuration to laminate the same in plural in an axial direction. FIG. 8 shows an example of the split piece. The split piece comprises teeth 1 with slots 3 therebetween, into which a winding (not shown) is inserted, and a core back 2 defining an outer periphery of the teeth 1.

FIGS. 9 and 10 show a structure of a stator core of a conventional rotating electrical machine. FIG. 9 is a cross sectional view showing the stator core as viewed in a circumferential direction, a half thereof a diametrical direction and a portion close to an axial end thereof. FIG. 10 is a view showing the stator core as viewed from an inside diameter side in a diametrical direction corresponding to a direction indicated by "A" in FIG. 9. As shown in FIG. 10, cooling ducts 5 are formed by interposing rectangular-shaped or I-shaped duct spacing pieces 8 into the stator core 4 to provide for clearances, and a cooling medium is caused to flow diametrically of the cooling ducts 5 to cool the core and an armature winding 6.

FIG. 12 shows a constructional example of a conventional rotating electrical machine. The example comprises a rotating electrical machine of a type having a heat exchanger and causing a cooling medium to circulate therein for cooling.

Usually, a rotating electrical machine comprises a rotor 7 formed by winding a field winding round a rotor core, and a stator arranged in opposition to the rotor 7 with a predetermined spacing (called an air gap) therebetween and formed by winding an armature winding (stator winding) 6 round the stator core 4.

With the rotating electrical machine thus formed, a part of a cooling medium which is increased in pressure by a fan 23 flows from an axial end toward a center along the rotor 7 and toward an air gap which is a diametrical gap between the rotor 7 and the stator to cool the stator core 4 and the armature winding 6 in an exhaust section 26, which extends radially outwardly through the stator core 4, to be subjected to heat removal in a heat exchanger 29 to get again to the fan 23 through a cooling medium flowing path 25.

The remaining cooling medium flows radially outwardly from the fan 23 to cool the stator core 4 and the armature winding 6 in an intake section 27, which extends radially inwardly through the stator core 4, via the cooling medium flowing path 25 to get to the air gap to cool the stator core 4 and the armature winding 6 to join a cooling medium, which flows into the exhaust section 26, in the air gap.

When the rotating electrical machine operates, a winding, through which an electric current passes, constitutes a main heat generating part. In a large-sized rotating electrical machine, with a view to cool such generation of heat, cooling ducts are formed between laminated steel sheets in the manner described above and a cooling medium is caused to flow radially to cool a winding and a stator core.

At this time, in a rotating electrical machine, a cooling effect at neighborhood of the axial center is decreased since the neighborhood of the axial center is positioned most downstream in a cooling medium flowing path and therefore a cooling medium becomes high in temperature. Therefore, a flowing, cooling medium is in some cases increased in quantity by increasing the number of cooling ducts per unit axial length in the vicinity of the axial center.

On the other hand, in a stator core, an alternating magnetic flux acts, so that a loss is generated and heat is generated. In particular, with a rotating electrical machine, which is used in turbine-driven generators to include a rotor having two or four magnetic poles, a path, through which magnetic fluxes pass, in teeth of a core is small in volume to lead to an increase in magnetic flux density, thus causing an increase in heat generation density. Besides, a core which is a magnetic material is decreased in volume in a location, in which the number of cooling ducts per unit axial length is increased as described above, as compared with the remaining locations when locally observed, so that magnetic flux density of the core is increased and a loss is increased. That is, by increasing ducts in number for the purpose of cooling a winding, there is a possibility that loss, that is, heat generation is increased in the core.

With a rotating electrical machine formed with a ventilating circuit, in which a plurality of ventilating sections permitting a cooling medium to flow radially outwardly and radially inwardly of a cooling duct, a cooling medium is increased in temperature in a ventilating section or sections positioned downstream of the ventilating circuit.

On the other hand, in teeth positioned at an axial end of a stator, an eddy current is generated in an axial cross section of the teeth by a magnetic flux incident in an axial direction from a rotor. While the magnitude of a loss caused by the eddy current is dependent upon the density of an incident magnetic flux and the cross sectional area of the tooth, a location of heat generation is local and tip ends of that teeth, on which a loss is caused, is made high in temperature in some cases. In particular, with a machine involving a large electric loading, a magnetic flux leaking from a coil end is increased in quantity to lead to an increase in loss for reasons of a large electric current and a large coil end length, and therefore, a measure of reduction in loss and enhanced cooling such as the provision of a tapered portion at an end of a stator core and the provision of a slit on an axial cross section of teeth is taken as proposed in JP-A-2006-74880.

In relation to the matter described above, as a measure, which copes with generation of a loss on teeth, in particular, at an end of a stator core, U.S. Pat. No. 7,057,324 shows an example, in which a direction of easy magnetization of a steel sheet and a direction of magnetic flux in teeth agree with each other at an end of a stator core. Since a direction of magnetic flux in teeth and a direction of magnetic flux in a core back are perpendicular to each other, however, a magnetic flux is hard to pass through the core back, so that there is a possibility of an increase in loss.

As an example of reduction in generation of heat on a core, JP-A-2000-50539 shows an example, in which grain oriented steel sheets and non-oriented steel sheets are alternately laminated, and JP-A-61-62334 shows an example, in which amorphous metallic sheets are laminated at an end of a stator core. In all the examples, an attention is paid to easiness, with which a magnetic flux passes through laminated steel sheets, and to iron loss, and steel sheets of plural kinds are laminated to achieve reduction in heat generation.

However, a magnetic material is nonlinear in magnetization characteristic and easiness, with which a magnetic flux passes therethrough, that is, magnetic permeability is changed according to the density of a magnetic flux, which acts. In recent years, many rotating electrical machines are designed to be increased in power density and made small in size and the density of a magnetic flux acting on a stator core is set to a high density of a magnetic flux close to saturation magnetization. In the case where a magnetic flux density close to saturation magnetization is acted, a magnetic resistance increases since a magnetic material is equivalent in magnetic permeability to an air, so that there is also a possibility that a magnetic flux makes a circuit in an axial direction in the same manner at the end as described above and a magnetic flux in a direction of lamination increases to lead to an increase in loss.

SUMMARY OF THE INVENTION

The invention has been thought of in view of the matter described above and has its object to provide a rotating electrical machine, in which an attention is paid to a temperature of the rotating electrical machine and an improvement in temperature distribution is achieved, in particular, in the vicinity of a stator winding to accomplish an improvement in reliability.

In order to attain the object, the invention provides a rotating electrical machine comprising a rotor formed by winding a field winding round a rotor core, and a stator arranged in opposition to the rotor with a predetermined spacing therebetween and formed by winding a stator winding round a stator core, and wherein the stator core is formed by punching a split piece, which comprises teeth for insertion of the stator winding thereinto and a core back on an outer periphery thereof, from a magnetic steel sheet, and laminating a plurality of those circular configurations in an axial direction, in which a plurality of the split pieces are arranged in a circle in a circumferential direction, and wherein the stator core comprises magnetic steel sheets which are different in magnetic permeability in a diametrical direction between at an axial end of and at an axial central portion of the stator core.

Specifically, the rotating electrical machine of the invention has a feature in that the magnetic steel sheets at the axial central portion of the stator core are higher in magnetic permeability in the diametrical direction than the magnetic steel sheets at the axial end thereof, or the stator core has a plurality of grain oriented magnetic steel sheets laminated at the axial end thereof and has a plurality of non-oriented magnetic steel sheets laminated at the axial central portion thereof, or the magnetic steel sheets in the axial central portion of the stator core are larger in thickness than the magnetic steel sheets at the axial end thereof.

According to the invention, a rotating electrical machine can be provided which is high in reliability by an improvement in temperature distribution in the vicinity of a stator winding.

Other objects, features and advantages of the invention will become apparent from the following description of the embodiments of the invention taken in conjunction with the accompanying drawings.

DESCRIPTION OF PREFERRED EMBODIMENTS

Figure 1:
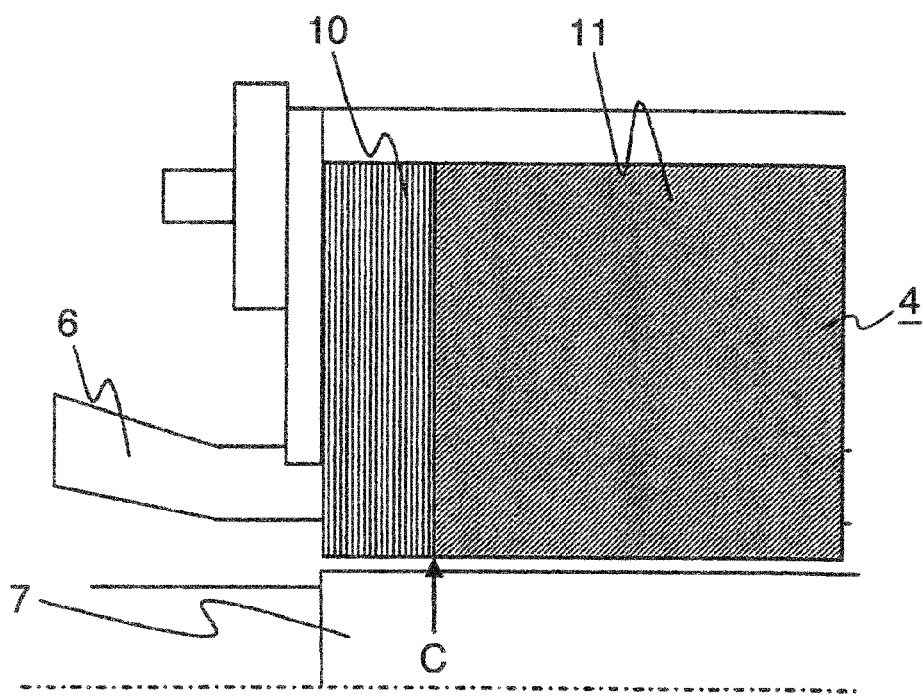
FIG. 1 is a cross sectional view of a first embodiment of a rotating electrical machine, according to the invention, in the vicinity of an axial end.

Embodiments of a rotating electrical machine according to the invention will be described below with reference to the drawings. In addition, the same reference numerals as those in the related art are used.

FIG. 1 is a cross sectional view of a first embodiment of a rotating electrical machine according to the invention in which a stator core 4 is viewed in a circumferential direction. FIG. 1 shows a half of the rotating electrical machine in a diametrical direction and a portion thereof close to an axial end.

Figure 11A:
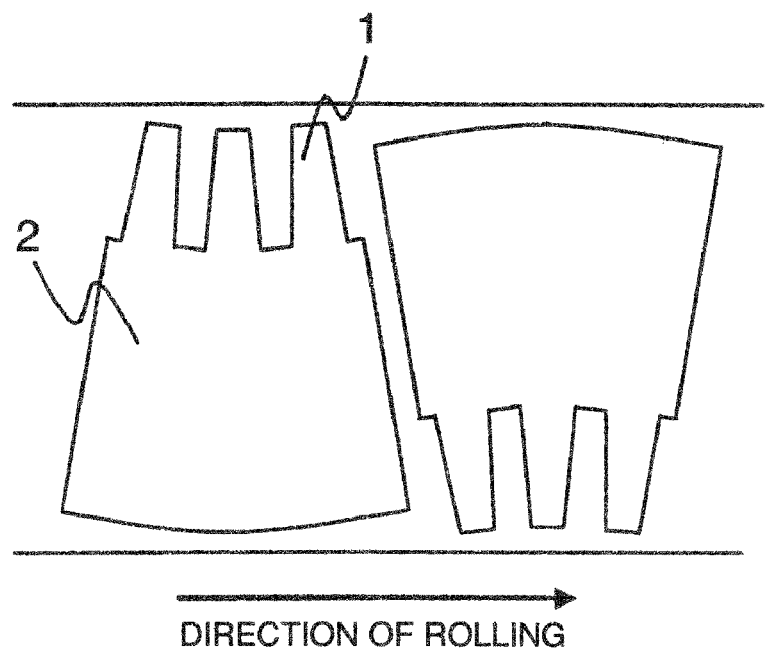
FIGS. 11A and 11B are views showing punching of split pieces from a steel strip adopted in a stator core.
Figure 11B:
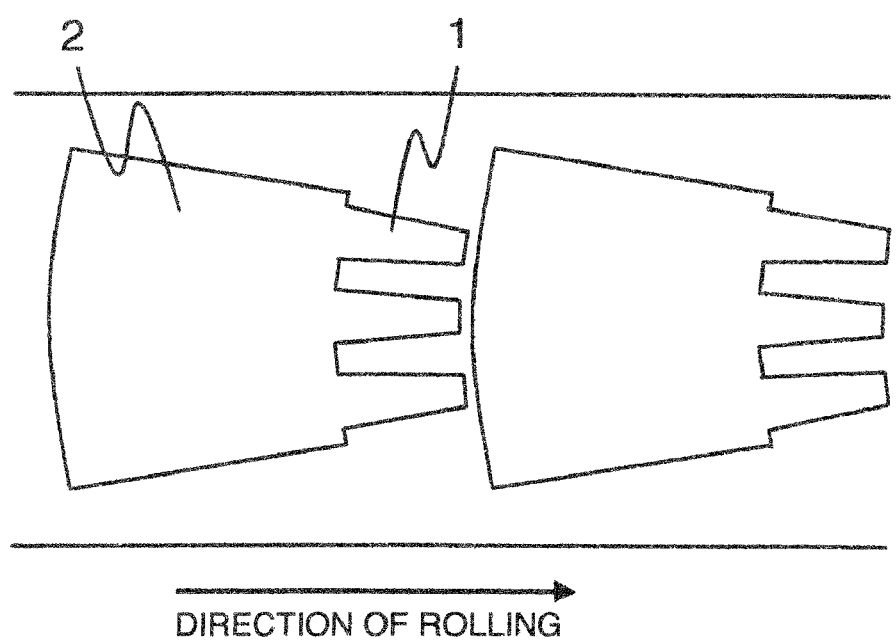
Figure 12:
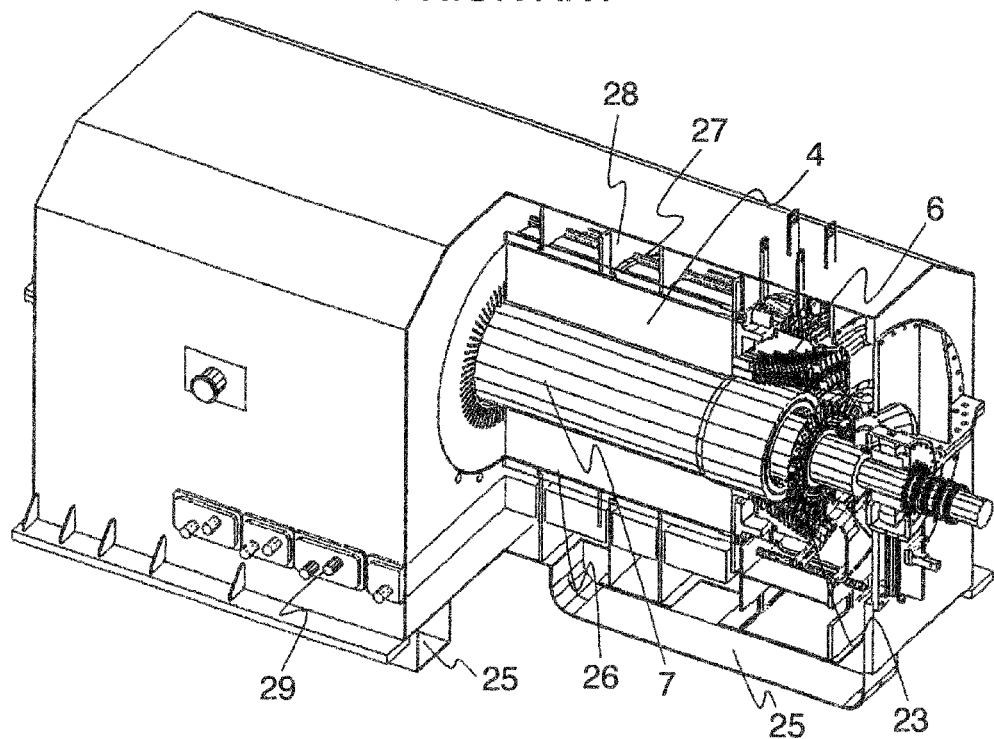
FIG. 12 is a perspective view showing a conventional rotating electrical machine with a part thereof broken away.

Grain oriented magnetic steel sheets 10 are laminated at an axial end of the stator core 4, non-oriented magnetic steel sheets 11 are laminated at an axial central portion of the stator core, and the respective steel sheets are formed by split pieces punched from a steel strip in a direction, in which teeth 1 are perpendicular to a direction of rolling as shown in FIG. 11A. Accordingly, a circumferential direction of the stator core substantially corresponds to the direction of rolling and a diametrical direction thereof substantially corresponds to a vertical direction to the direction of rolling.

Thereby, in the first embodiment, magnetic steel sheets which are different in magnetic permeability in the diametrical direction are laminated at an axial end of and at an axial central portion of the stator core 4.

In the first embodiment, magnetic steel sheets used generally in rotating electrical machines are employed as magnetic steel sheets used for the stator core 4. As is well known, the grain oriented magnetic steel sheets 10 are excellent in magnetic permeability generally in a direction of rolling as compared with the non-oriented magnetic steel sheets 11 but low in magnetic permeability in a direction perpendicular to the direction of rolling as compared with the non-oriented magnetic steel sheets 11.

Therefore, paying an attention to heat generation in the teeth 1, heat generation at the teeth of the non-oriented magnetic steel sheets 11 is smaller than heat generation at the teeth of the grain oriented magnetic steel sheets 10.

In a modification of the first embodiment, a magnetic permeability at a magnetic flux density of 1.5 T may be used as an index of easiness of pass of a magnetic flux in the teeth 1. While a magnetic steel sheet used generally in rotating electrical machines has a saturation magnetization in the order of 2 T, its magnetization characteristic is considerably changed in inclination around 1.5 T. In the case where the magnetic flux density in the diametrical direction becomes one close to a saturation magnetization, magnetic resistance increases and correspondingly loss increases.

In contrast, in the invention, a magnetic permeability at 1.5 T is adopted as an index of easiness of pass of magnetic flux in the teeth 1 of the stator core 4, and a material is selected so that the non-oriented magnetic steel sheets 11 are superior to the grain oriented magnetic steel sheets 10 in magnetic permeability at a magnetic flux density of 1.5 T in the diametrical direction. Thereby, it is possible to suppress generation of heat in the teeth 1 in a rotating electrical machine, which is designed to have a magnetic flux density, of which a maximum magnetic flux density in the teeth 1 is close to a saturation magnetization.

The same effect is produced even when a magnetic flux density in a magnetic field of 5000 A/m, which is a magnetizing force, by which general non-oriented magnetic steel sheets 11 can reach a magnetic flux density in the order of 1.5 T.

In addition, in the first embodiment, that portion, on which the grain oriented magnetic steel sheets 10 are laminated, corresponds to an axial end of the stator core 4 and that portion, on which the non-oriented magnetic steel sheets 11 are laminated, corresponds to an axial central portion of the stator core 4.

Figure 3:
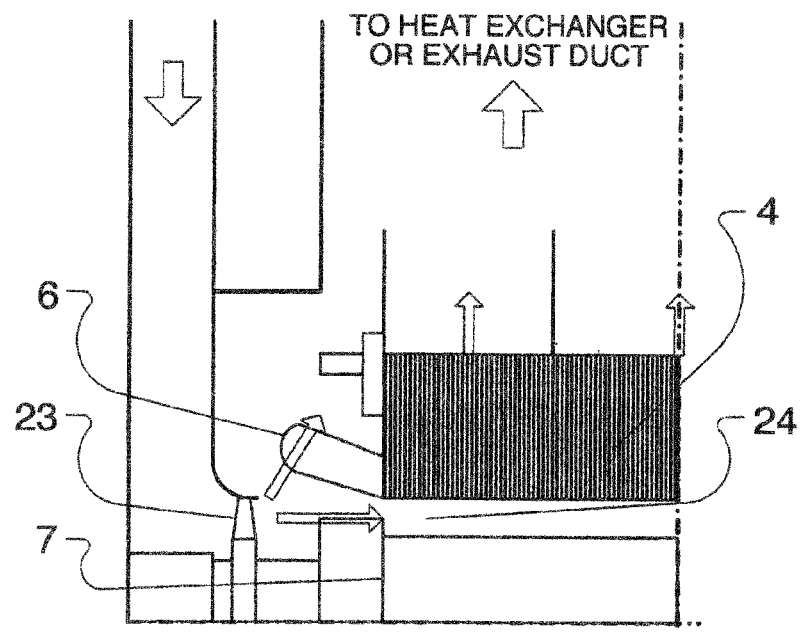
FIG. 3 is a view showing a flowing path of a cooling medium, according to the second embodiment of the invention, in the vicinity of the axial end.

FIG. 3 is a cross sectional view of a path, along which a cooling medium flows, in a second embodiment of the invention and a stator core 4 as viewed in a circumferential direction, and FIG. 3 shows a half region of the second embodiment in a diametrical direction and a half region of the second embodiment in an axial direction.

Arrows in the drawing indicate a direction, in which a cooling medium flows, and the cooling medium which is increased in pressure by a fan 23 gets to a stator core 4 through a rotor 7 and an air gap 24 to be exhausted through cooling ducts (not shown), or to be circulated again into the path through a heat exchanger, while cooling an armature winding 6 and the stator core 4.

Figure 2:
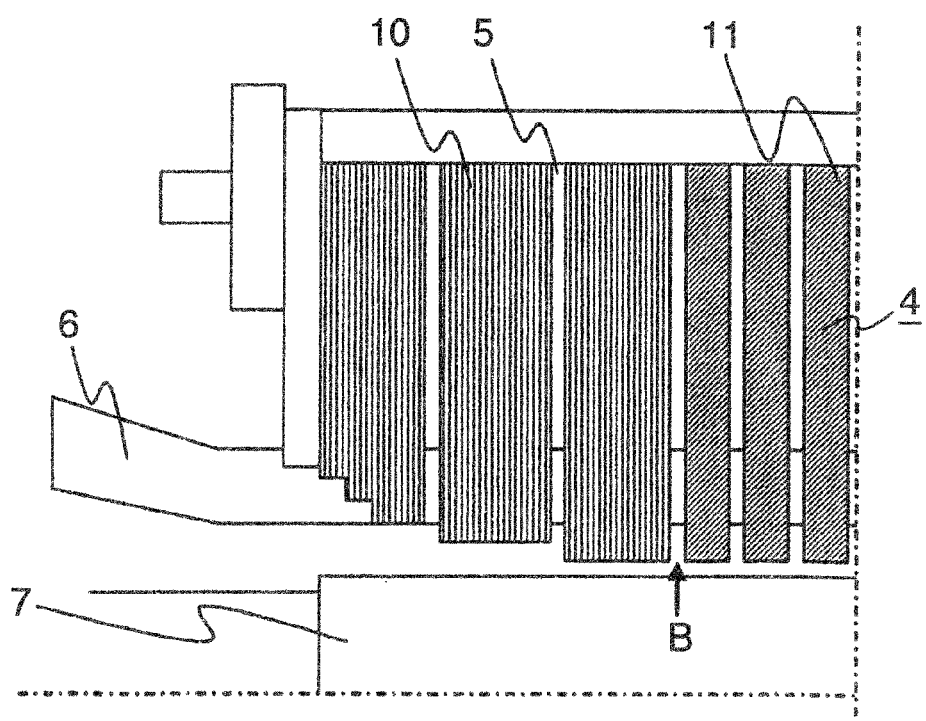
FIG. 2 is a cross sectional view of a second embodiment of the rotating electrical machine, according to the invention, in the vicinity of an axial end.

FIG. 2 shows a structure of the stator core 4 in the second embodiment of the invention. As shown in FIG. 2, an axial spacing between cooling ducts 5 in an axial central region of the stator core 4 is made smaller as compared with an average axial spacing of the cooling ducts, which is obtained by dividing an axial length of the stator core by the total number of cooling ducts, so that flow rate of the cooling medium through the axial central region of the stator core 4 is increased. In the case where a conventional structure is applied, a magnetic material is decreased in volume in an area, in which the number of cooling ducts is increased, so that an increase in magnetic flux density of the core and an increase in loss are caused.

In contrast, in the second embodiment, magnetic steel sheets used generally in rotating electrical machines are employed as steel sheets used for the stator core 4. The stator core 4 is formed from split pieces each punched from a steel strip as shown in FIG. 11A such that a plurality of the grain oriented magnetic steel sheets 10 are laminated at an axial end, at which axial spacings between the cooling ducts 5 are larger than an average spacing, and a plurality of the non-oriented magnetic steel sheets 11 are laminated in an axial central region, in which axial spacings between the cooling ducts 5 are smaller than the average spacing.

In other words, assuming that one packet is obtained by laminating a plurality of the grain oriented magnetic steel sheets 10, three packets are arranged at an axial end region of the stator core 4 with the cooling ducts 5 therebetween, while assuming that one packet is obtained by laminating a plurality of the non-oriented magnetic steel sheets 11, plural (three packets in a state shown in FIG. 2) packets are arranged in an axial central region with the cooling ducts 5 therebetween, in which arrangement an axial width of one packet at the axial end, at which the plurality of the grain oriented magnetic steel sheets 10 are laminated, is larger than an axial width of one packet in the axial central region, in which the plurality of the non-oriented magnetic steel sheets 11 are laminated.

Thereby, the axial central region, in which axial spacings between the cooling ducts 5 are smaller than the average spacing, is high in magnetic permeability in a diametrical direction, and paying an attention to heat generated in the teeth, it is possible to reduce heat generated from the teeth of the stator core 4 in an area, in which the non-oriented magnetic steel sheets 11 are used, as compared with heat generated in an area, in which the grain oriented magnetic steel sheets 10 are used.

Figure 6:
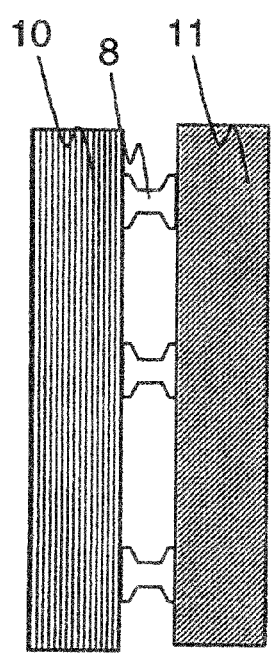
FIG. 6 is a cross sectional view showing a portion of a laminated core in the second embodiment of the invention.

FIG. 6 is a view showing the stator core 4 as viewed from a side of a rotor as indicated by an arrow "B" in FIG. 2. In FIG. 6, as a modification of the invention, duct spacing pieces 8 arranged between a stator core formed by laminating the grain oriented magnetic steel sheets 10 and a stator core formed by laminating the non-oriented magnetic steel sheets 11 are formed from a non-magnetic material.

With such construction, it is possible to reduce magnetic fluxes incident in the duct spacing pieces 8, thus enabling preventing overheating by reduction in loss.

In the second embodiment, the number of cooling ducts is 11 and axial spacings between the cooling ducts and steel sheets, respectively, are two in kind for the simplicity of the drawings, but the number of cooling ducts may be several tens or more and axial spacings between the cooling ducts and steel sheets may be three or more in kind.

In addition, in the Embodiment, a portion of three packets, in which the grain oriented magnetic steel sheets 10 are laminated, corresponds to the axial end of the stator core 4 and a portion of the remaining packets, in which the non-oriented magnetic steel sheets 11 are laminated, in FIG. 2 corresponds to the axially central portion of the stator core 4.

Figure 4:
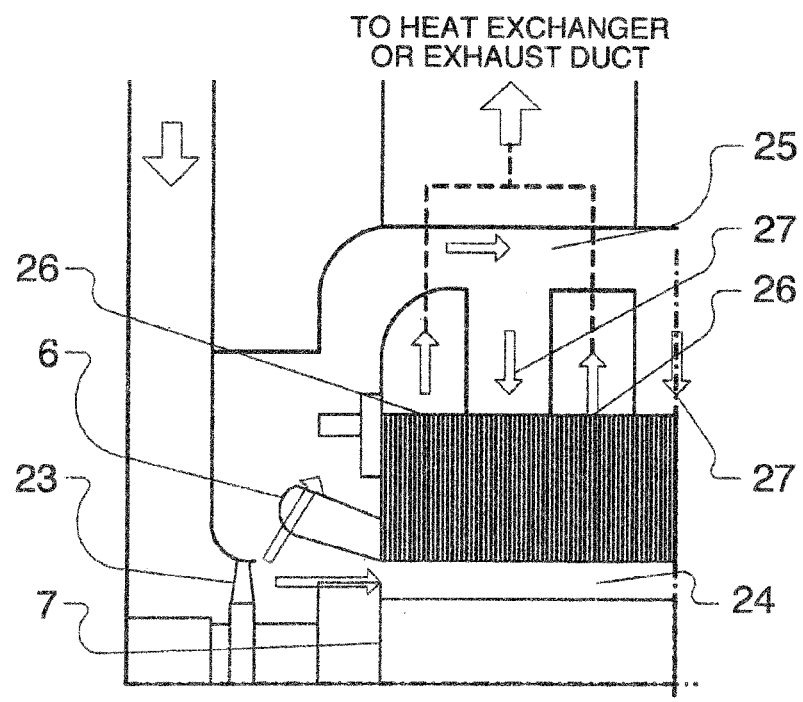
FIG. 4 is a view showing a flowing path of a cooling medium in a third embodiment of the rotating electrical machine, according to the invention, in the vicinity of an axial end.

FIG. 4 shows a path, along which a cooling medium flows, in a third embodiment of the invention. Similarly to FIG. 3, FIG. 4 is a cross sectional view as viewed in a circumferential direction, and shows a half region of the third embodiment in a diametrical direction and a half region of the third embodiment in an axial direction.

Arrows in the drawing indicate a direction, in which a cooling medium flows, and the cooling medium, which is increased in pressure by a fan 23 for flowing of the cooling medium, goes through a rotor 7 and an air gap 24 to cool a stator core 4 and an armature winding 6 in exhaust sections 26, which are positioned at an axial end region and in a axially central region, to be exhausted through cooling ducts (not shown), or to be circulated again into the path through a heat exchanger. At this time, a part of the cooling medium, which is increased in pressure by the fan 23, cools the armature winding 6, then goes through a cooling medium flowing path 25 to cool the stator core 4 and the armature winding 6 in an intake section 27, in which a cooling medium in the machine is caused to flow radially inwardly of the cooling ducts from radially outwardly thereof in an opposite manner to the exhaust section, then joins a cooling medium, which flows through the rotor 7 and the air gap 24, in the air gap 24, and is exhausted through cooling ducts (not shown) in the exhaust sections 26, or circulated again into the path through a heat exchanger.

Figure 5:
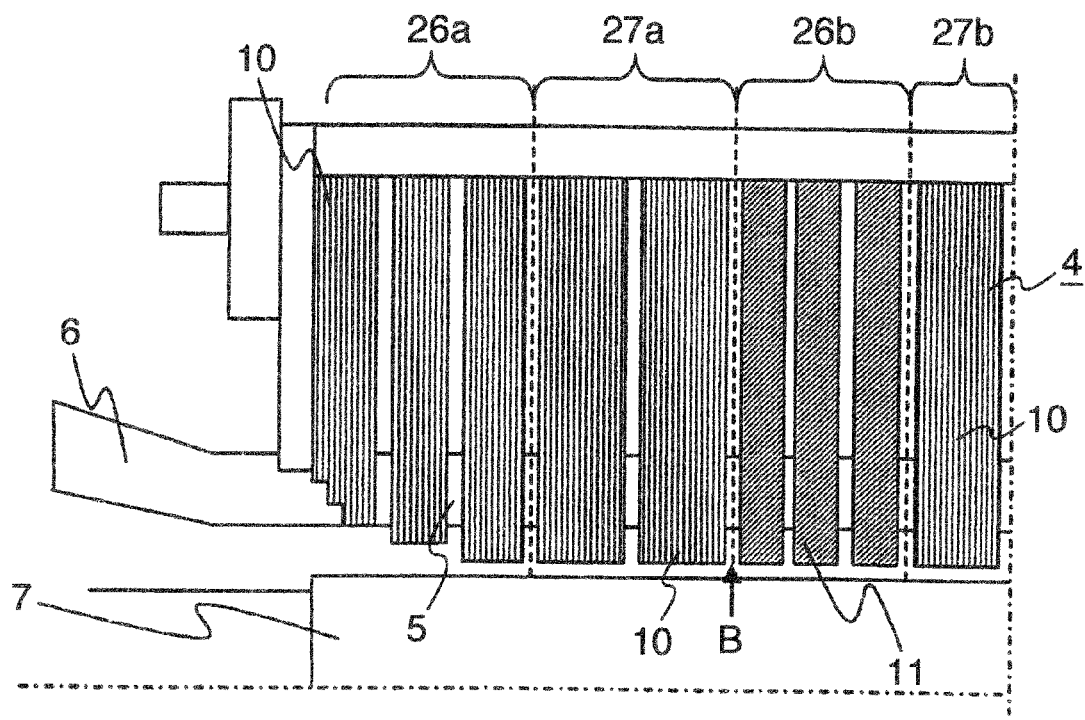
FIG. 5 is a cross sectional view of the third embodiment of the rotating electrical machine, according to the invention, in the vicinity of the end axial.

FIG. 5 shows a structure of the stator core in the third embodiment of the invention. In FIG. 5, non-oriented magnetic steel sheets 11 are laminated to form the exhaust section 26b positioned in an axial central region, and grain oriented magnetic steel sheets 10 are laminated to form the exhaust section 26a other than the exhaust section 26b, and the intake sections 27a, 27b. Here, the non-oriented magnetic steel sheets 11 are made of split pieces punched from a steel strip as shown in FIG. 11A.

The exhaust section 26b and positioned downstream of the cooling medium flowing path is expected to be increased in temperature since the cooling medium flows thereinto after mainly passing through the intake sections 27a, 27b. Hereupon, in the their embodiment, an axial spacing between the cooling ducts in the exhaust section 26b is made smaller than an average one in order to increase the quantity of a cooling medium flowing in the exhaust section 26b positioned in the axial central region.

Described more specifically, the exhaust section 26a at the axial end region of the stator core 4 comprises three packets arranged with the cooling ducts 5 therebetween, in each of which packets a plurality of the grain oriented magnetic steel sheets 10 are laminated, the intake sections 27a, 27b positioned in an axial central region comprise two packets arranged with the cooling ducts 5 therebetween, in each of which packets a plurality of the grain oriented magnetic steel sheets 10 are laminated, and the exhaust section 26b positioned in the axial central region comprises three packets arranged with the cooling ducts 5 therebetween, in each of which packets a plurality of the non-oriented magnetic steel sheets 11 are laminated, whereby the stator core 4 is formed.

At this time, one packet of the intake sections 27a, 27b positioned at the axial end region, at which the plurality of the grain oriented magnetic steel sheets 10 are laminated, are largest in axial width, one packet of the exhaust section 26a positioned at the axial end region, at which the plurality of the grain oriented magnetic steel sheets 10 are laminated, is large next thereto in axial width, and one packet of the exhaust section 26b positioned in the axial central region, in which the plurality of the non-oriented magnetic steel sheets 11 are laminated, is smallest in axial width. It does not matter if one packet of the exhaust section 26a positioned at the axial end region is the same in axial width as one packet of the intake sections 27a, 27b positioned in the axial central region.

In addition, in the third embodiment, while the reference numeral 26a denotes an exhaust section, the non-oriented magnetic steel sheets 11 are laminated only in the exhaust section 26b since it is expected that the exhaust section 26b, through which a cooling medium passing through the intake sections 27a, 27b positioned in the axial central region and a cooling medium passing through the rotor 7 flow, is high in cooling medium temperature.

In the third embodiment, the magnetic permeability at 1.5 T is adopted as an index of easiness, with which a magnetic flux passes in the teeth of the stator core, and a material is selected so that the non-oriented magnetic steel sheets 11 are excellent as compared with the grain oriented magnetic steel sheets in magnetic permeability in a diametrical direction of the grain oriented magnetic steel sheets 10 and the non-oriented magnetic steel sheets 11. Thereby, it is possible to reduce that going-round of a magnetic flux in an axial direction, which is attributable to an increase in magnetic flux density caused by reduction of a magnetic material of the intake section in volume, thus enabling suppressing generation of heat.

In the third embodiment, the number of ventilating sections is 7 and the number of cooling ducts is 17 for the simplicity of the drawings, but the number of ventilating sections may be several except 7 and the number of cooling ducts may be several tens or more.

As a modification of the third embodiment, the magnetic permeability in a magnetic field of 5000 A/m may be adopted as an index of easiness, with which a magnetic flux passes in the teeth, instead of the magnetic permeability at a magnetic flux density of 1.5 T.

In addition, in the third embodiment, in FIG. 5, the exhaust section 26a comprising three packets, in which the grain oriented magnetic steel sheets 10 are laminated, is positioned at the axial end region of the stator core 4, and the exhaust section 26b and the intake sections 27a, 27b are positioned in the axial central region of the stator core 4.

Figure 7:
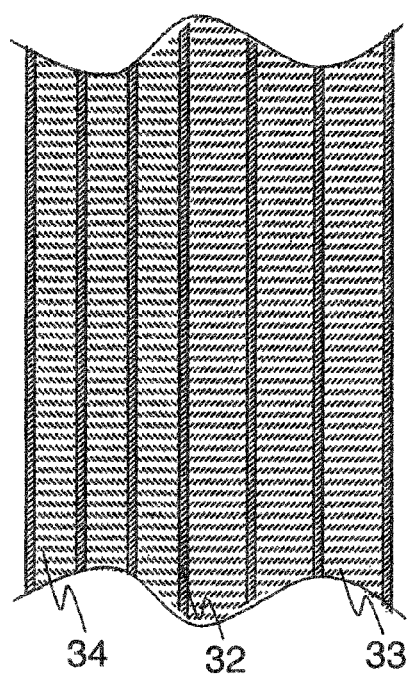
FIG. 7 is an enlarged cross sectional view showing a laminated core according to a fourth embodiment of the invention.
Figure 8:
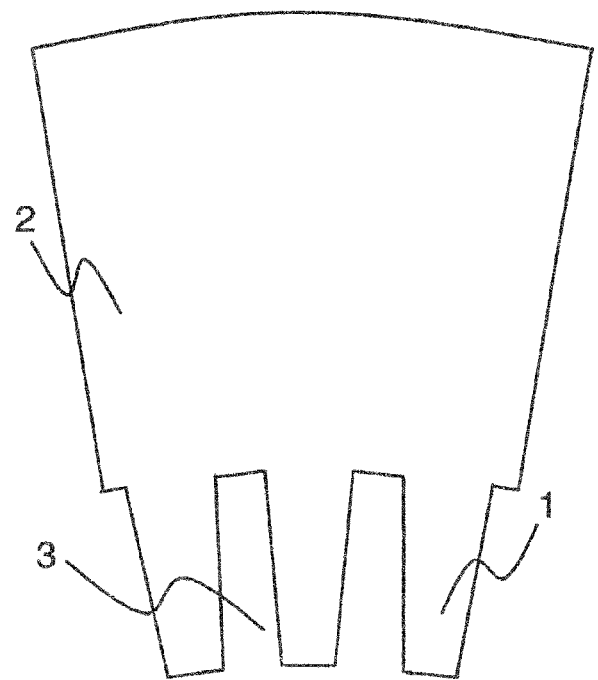
FIG. 8 is a view showing a core split piece punched from a steel strip adopted in a stator core.
Figure 9:
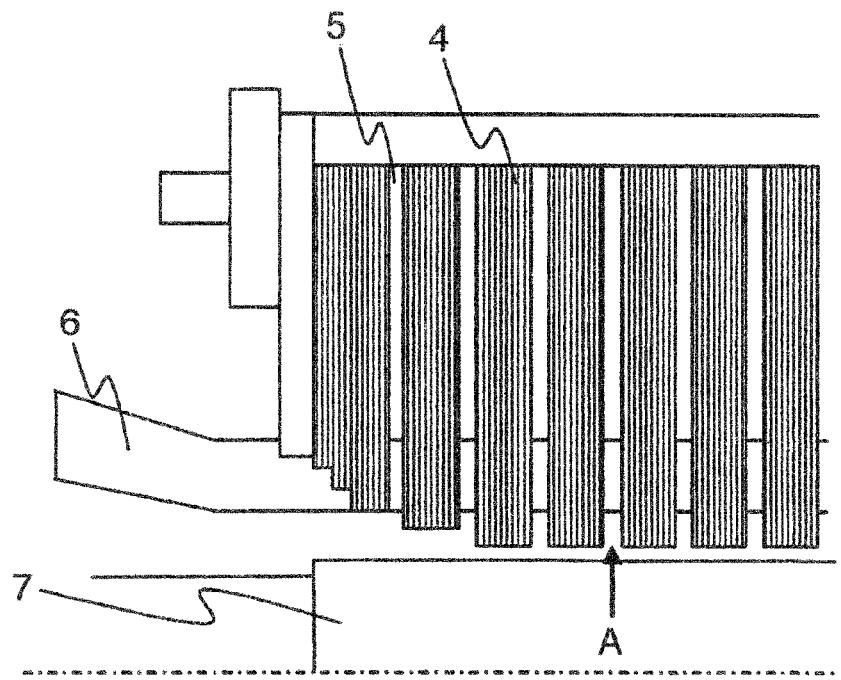
FIG. 9 is a cross sectional view showing an axial end of a stator core in a conventional rotating electrical machine.
Figure 10:
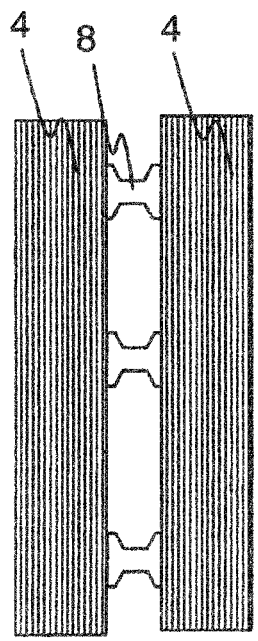
FIG. 10 is a view showing a cooling duct in a conventional rotating electrical machine, as viewed from an inside diameter side in a diametrical direction.

FIG. 7 is an enlarged view showing a core in a fourth embodiment of the invention and shows a stator core as viewed from a side of a rotor as indicated by an arrow C in FIG. 1. Like in FIG. 1, the core is structured so that non-oriented magnetic steel sheets 11 are laminated centrally in an axial direction and grain oriented magnetic steel sheets 10 are laminated at an axial end.

In the fourth embodiment, non-oriented magnetic steel sheets 33 having a thickness of 0.5 mm are laminated centrally in the axial direction, grain oriented magnetic steel sheets 34 having a thickness of 0.35 mm are laminated at the axial end, and all insulating varnish layers 32 applied between the steel sheets have the same thickness.

In addition to reduction in generation of heat in teeth of the stator core, for which the non-oriented magnetic steel sheets 11 described in the first embodiment are used, heat conduction in the steel sheets is good in an inplane direction as compared with that in a direction of lamination, so that heat conduction to a core back from teeth is made favorable in a central area, in which the non-oriented magnetic steel sheets 33 having a thickness of 0.5 mm are laminated, thus enabling moderating a temperature rise in the vicinity of a winding.

In case of using a magnetic steel sheet having the equivalent, specific resistance and a thickness of 0.5 mm, there is a possibility of an increase in eddy current loss as compared with a magnetic steel sheet having a thickness of 0.35 mm. In contrast, as a modification of the fourth embodiment, a steel sheet having a thickness of 0.5 mm and a high specific resistance as compared with that of a magnetic steel sheet having a thickness of 0.35 mm is used to enable achieving an increase in core volume while achieving reduction in eddy current loss.

Figure 13:
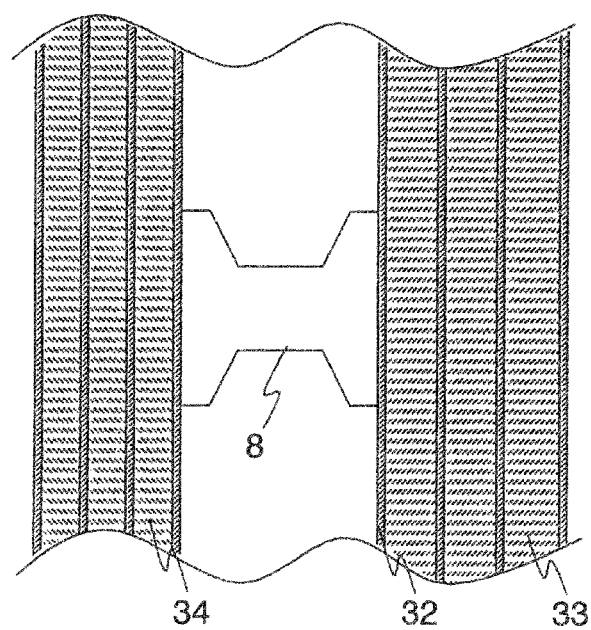
FIG. 13 is an enlarged cross sectional view showing a portion of a laminated core according to a fifth embodiment of the rotating electrical machine of the invention.

FIG. 13 is an enlarged view of a core in a fifth embodiment of the invention, and shows a stator core as viewed from a side of a rotor as indicated by the arrow B in FIGS. 2 and 5.

As shown in FIG. 13, non-oriented magnetic steel sheets 33 having a thickness of 0.5 mm are laminated in an area, in which an axial spacing between cooling ducts is small, or in an exhaust section, grain oriented magnetic steel sheets 34 having a thickness of 0.35 mm are laminated in an area, in which an axial spacing between cooling ducts is large, and all insulating varnish layers 32 applied between the magnetic steel sheets have the same thickness.

As described in the second embodiment, since a magnetic material is decreased in volume in an area, in which an axial spacing between cooling ducts is small, teeth is increased in magnetic flux density and a magnetic flux is hard to pass in a diametrical direction. A magnetic flux becoming hard to pass in the diametrical direction goes round in an axial direction and an eddy current loss is generated in axial cross sections of the teeth in addition to that iron loss, which is generated by passage of magnetic fluxes in a magnetic steel sheet. In contrast, in the fifth embodiment, the non-oriented magnetic steel sheets 33 having a thickness of 0.5 mm are laminated in an area, in which an axial spacing between cooling ducts is small, to increase a magnetic material in volume and to restrict an increase in magnetic flux density to decrease the quantity of magnetic fluxes, which go round in an axial direction.

Since heat conduction in a magnetic steel sheet is good in an inplane direction as compared with that in a direction of lamination, the non-oriented magnetic steel sheets 33 having a thickness of 0.5 mm are laminated in the exhaust section to make heat conduction to a core back from teeth favorable as compared with that section, in which the grain oriented magnetic steel sheets 34 having a thickness of 0.35 mm are laminated, thus enabling moderating a temperature rise in the vicinity of a winding.

In case of using a magnetic steel sheet having the equivalent specific resistance and a thickness of 0.5 mm, there is a possibility of an increase in eddy current loss as compared with the use of a magnetic steel sheet having a thickness of 0.35 mm. In contrast, as a modification of the fifth embodiment, a magnetic steel sheet having a thickness of 0.5 mm and a high specific resistance as compared with that of a magnetic steel sheet having a thickness of 0.35 mm is used to enable an increase in core volume while achieving reduction in eddy current loss.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electrical machine comprising:
a rotor comprising a rotor core and a field winding wound round the rotor core; and
a stator comprising a stator core and a stator winding wound round the stator core, the stator being arranged in opposition to the rotor with a predetermined spacing therebetween,
wherein the stator core is formed by punching a plurality of split pieces, each of which comprises teeth for insertion of the stator winding thereinto and a core back on an outer periphery thereof, from a magnetic steel strip so that parts of the split pieces corresponding to a circumferential direction of the stator core substantially correspond to a rolling direction of the magnetic steel strip when punched, arranging the split pieces in circular configurations of magnetic steel sheets in the circumferential direction of the stator core, and laminating a plurality of the circular magnetic steel sheets in an axial direction of the stator core,
wherein the stator core has a plurality of grain oriented magnetic steel sheets laminated at an axial end region thereof and has a plurality of non-oriented magnetic steel sheets laminated in an axial central region thereof,
wherein individual ones of the magnetic steel sheets at the axial central region of the stator core are each larger in thickness than individual ones of the magnetic steel sheets at the axial end region thereof, and
wherein a magnetic permeability in the teeth of the non-oriented magnetic steel sheets in a diametrical direction is superior to a magnetic permeability in the teeth of the grain oriented magnetic steel sheets in the diametrical direction.

2. The rotating electrical machine according to claim 1, wherein the magnetic steel sheets at the axial end region and the magnetic steel sheets at the axial central region of the stator core are different from each other in magnetic permeability in a diametrical direction at a magnetic flux density of 1.5 T.

3. The rotating electrical machine according to claim 1, wherein the magnetic steel sheets at the axial end region and the magnetic steel sheets at the axial central region of the stator core are different from each other in magnetic permeability in a diametrical direction at a magnetic field of 5000 A/m.

* * * * *